3,399,265
KILLING INSECTS BY APPLYING N-METHYL META - ALKYLAMIDOPHENYL CARBAMATES THERETO

Karoly Szabo, Syracuse, N.Y., assignor to Stauffer Chemical Company, New York, N.Y., a corporation of Delaware
No Drawing. Filed Dec. 27, 1965, Ser. No. 517,886
5 Claims. (Cl. 424—300)

This invention relates to certain amidophenyl carbamates and their use as effective insecticides. More specifically, this invention relates to certain N-methyl m-alkylamidophenyl carbamates and to the utility of said compounds in insecticidal compositions.

The compounds comprising the instant class of insecticides correspond to the general formula

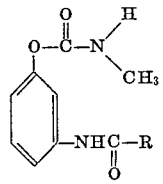

wherein R is lower alkyl. Also included is a method of preparing, using and applying said compositions.

The compounds herein mentioned whose insecticidal utility is contemplated can be prepared by several methods. The most convenient method applied in preparing the compounds was the reaction between the appropriate m-alkylamidophenol and methyl isocyanate. The reaction proceeds readily in the liquid phase. The employment of an inert organic solvent, e.g. chloroform, ether, dioxane, or acetone, was also useful, facilitating processing as well as agitation of the reactants. A tertiary amine, preferably triethylamine, was used in catalytic amounts to promote the reaction. Temperatures that permit operation in the liquid phase and which are between room temperature and reflux temperature of the solvent, if any is used, are employed. Preferably the reaction mixture is refluxed, usually at an elevated temperature.

It will be observed that the compounds of the present invention are meta-substituted phenyl carbamates. In contrast the instant compounds are readily distinguished from the substituted phenyl carbamates as disclosed in Shulgin U.S. Patent 3,037,993, the closest prior art known to the applicant. While Shulgin finds particular interest and essentiality in para-substitution of the phenyl nucleus, the present inventor observed that particularly surprisingly and unexpectedly the meta-isomers as herein disclosed are substantially superior in insecticidal activity. This will be shown by comparative data in the activity tests. It has been found that the compounds given herein are particularly effective as insecticides.

Compounds of the present invention may be made in accordance with the following illustrative example.

Example.—Preparation of m-(N-methylcarbamoyloxy)-acetanilide

In 150 ml. of chloroform, as a solvent, were brought together 15.2 g. of m-hydroxyacetanilide and 6.0 g. methyl isocyanate. To this solution was added 0.3 ml. of triethylamine and a trace of dibutyl tin dilaurate as catalysts. The mixture was refluxed and stirred for one hour. A solid product formed during this period. The solid was separated by filtration. There was obtained 19.2 g. (93.6 percent yield) of the title compound, M.P. 155-7° C.

The homologs: m-(N-methylcarbamoyloxy)propionanilide, M.P. 154° C., m-(N-methylcarbamoyloxy)isobutyranilide, M.P. 153° C. and m-(N-methylcarbamoyloxy)-n-butyranilide, M.P. 176-7° C., were prepared in analogous reactions.

As previously mentioned, the herein described compositions produced in the above described manner are biologically active compounds which are useful and valuable in controlling various pest organisms. The compounds of this invention were tested in the following manner.

HOUSEFLY EVALUATION TEST

The fly specie, Musca domestica (Linn.), was subjected to evaluation tests for insecticides incorporating the compounds of the present invention.

Twenty-five female flies, three to five days old, were caged in cardboard mailing tubes 3⅛″ in diameter and 2⅝″ tall. The cages were supplied with cellophane bottoms and coarse mesh nylon tops. Each cage was provided with food and water. The candidate toxicant was dissolved in a volatile solvent, preferably acetone. The solution was pipetted into a petri dish bottom, allowed to air dry and placed in a cardboard mailing tube cage. The flies were continuously exposed to the known residue of the active compound in the cage. After twenty-four and forty-eight hours, counts were made to determine living and dead insects. The $LD_{50}$ values were calculated using well known procedures.

At the same time, utilizing similar test procedures, several para-substituted analogs of the herein disclosed meta-alkylamidophenyl N-methyl carbamates were subjected to housefly evaluation test. This data is also listed in the following table for comparative purposes.

TABLE

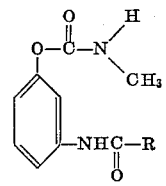

| Compound number | Alkanilide position | R | Housefly $LD_{50}$ (μg.) |
|---|---|---|---|
| 1 | Meta | Methyl | 5 |
| 2 | Meta | Ethyl | 3.5 |
| 3 | Meta | Isopropyl | 10 |
| 4 | Meta | n-Propyl | 3.5 |
| 5 | Para | Methyl | 500 |
| 6 | Para | Ethyl | 500 |
| 7 | Para | Isopropyl | 10,000 |
| 8 | Para | n-Propyl | 10,000 |

From these data it can be readily seen that the meta-substituted compounds of the present invention are valuable insecticides. Surprisingly and unexpectedly the meta-substituted compounds 1, 2, 3 and 4 are superior in activity over the analogous para-substituted derivatives of 5, 6, 7 and 8, respectively.

It was also found that m-(N-methylcarbamoyloxy) acetanilide effectively controlled lygus bug at 0.08 percent concentration. These sucking insects are serious economic threat to many crops. Recently it has been noted they are becoming more tolerant to DDT, therefore control has become increasingly difficult. The find of an effective agent to control these insects is very valuable.

From these data it can be seen that these compounds are valuable as insecticides. In practice the compounds are usually formulated with an inert adjuvant, utilizing methods well-known to those skilled in the art, thereby making them suitable for application. They may be used in the form of emulsions, nonaqueous solutions, wettable powders, vapors, dusts, dips and the like, as may be best fitted to the particular utility. The concentration of a compound of the present invention, constituting an effective amount, and the best mode of administration to a pest or its habitat may be easily determined by those skilled in the art of insect control. The disclosure is not meant to limit the action of the compounds to one particular insect species or the mode of effect thereon.

Various changes and modifications may be made without departing from the spirit and scope of the invention described herein as will be apparent to those skilled in the art to which it pertains. It is accordingly intended that the present invention shall only be limited by the scope of the appended claims.

I claim:

1. The method of killing insects comprising applying thereto an effective amount of a compound having the formula

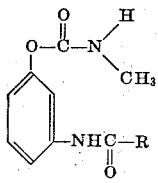

wherein R is lower alkyl.

2. The method of killing insects comprising applying thereto an effective amount of the compound m-(N-methylcarbamoyloxy) acetanilide.

3. The method of killing insects comprising applying to an insect habitat an effective amount of the compound m-(N-methylcarbamoyloxy)propionanilide.

4. The method of killing insects comprising applying thereto an effective amount of the compound m-(N-methylcarbamoyloxy)isobutyranilide.

5. The method of killing insects comprising applying thereto an effective amount of the compound m-(N-methylcarbamoyloxy)-n-butyranilide.

References Cited
UNITED STATES PATENTS 3,037,993 6/1962 Shulgin _____ 260—479 XR

FOREIGN PATENTS 1,381,253 11/1964 France.

LEWIS GOTTS, *Primary Examiner.*

S. K. ROSE, *Assistant Examiner.*